United States Patent
Keeley

[11] Patent Number: 5,966,519
[45] Date of Patent: *Oct. 12, 1999

[54] COMPUTER-AIDED DESIGN OF INTER-OPERABLE PRODUCTS

[75] Inventor: Thomas M. Keeley, Brookfield, Wis.

[73] Assignee: Allen-Bradley Company LLC, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/720,254

[22] Filed: Sep. 26, 1996

[51] Int. Cl.[6] .................................................. G05B 19/18
[52] U.S. Cl. ................................ 395/500.06; 395/500.02
[58] Field of Search ........................ 364/488, 489, 364/490, 491, 402, 468; 395/500, 600; 707/10, 104

[56] References Cited

U.S. PATENT DOCUMENTS

| | | | |
|---|---|---|---|
| 5,007,766 | 4/1991 | Jain et al. | 364/402 |
| 5,434,791 | 7/1995 | Koko et al. | 364/468 |
| 5,539,652 | 7/1996 | Tegethoff | 364/490 |
| 5,560,005 | 9/1996 | Hoover et al. | 395/600 |
| 5,630,127 | 5/1997 | Moore et al. | 395/615 |

*Primary Examiner*—Kevin J. Teska
*Assistant Examiner*—Thuan Do
*Attorney, Agent, or Firm*—Keith M. Baxter; John M. Miller; John J. Horn

[57] ABSTRACT

Inter-operability of products connected together to form an industrial control system is determined by defining each product as a set of services describing points of interface between the products and by determining complementary services necessary for inter-operability from a table listing complementary services. A new product may be evaluated for inter-operability by comparing its services to services of products with which inter-operability is desired. In one mode of operation after definition of the products in which inter-operability is desired, a necessary list of services is compiled from a database and translated by a relationship map to complementary services which define a virtual product having the desired inter-operability. Inter-operability of an entire control system may be thus modeled prior to construction.

14 Claims, 3 Drawing Sheets

| PRODUCT RELATIONSHIPS | | | 31 |
|---|---|---|---|
| PRODUCT 3 | PRODUCT 2 | MASTER | |
| PRODUCT 3 | PRODUCT 1 | PEER | |

| PRODUCT RELATIONSHIPS | | | | 31 |
|---|---|---|---|---|
| SYSTEM 1 | PRODUCT 1 | PRODUCT II | MASTER | |
| | PRODUCT 2 | PRODUCT IV | X | |
| | PRODUCT 4 | PRODUCT I | PEER | |

COMPUTER-AIDED DESIGN OF INTER-OPERABLE PRODUCTS

FIELD OF THE INVENTION

The present invention relates to industrial control systems and in particular to a software tool for aiding in the design of industrial control products.

BACKGROUND OF THE INVENTION

Industrial controllers are special purpose computers used for controlling industrial processes or manufacturing equipment.

Under the direction of a stored program, the industrial controller examines a series of inputs reflecting the status of the controlled process and changes outputs affecting control of the process. The inputs and outputs are most simply binary, that is "on" or "off"; however, analog inputs and outputs, taking on a continuous range of values, are also used.

The various components of an industrial controller may be spatially distributed about a factory or manufacturing facility to be interconnected by one or more communication links. A number of different communication links are commonly used in industrial controllers including proprietary links defined and used by a particular manufacturer and open links such as ControlNet, DeviceNet and Ethernet whose specifications are published and may be used broadly by a number of manufacturers and suppliers. The communication links differ in physical aspects, for example, the type of media (e.g., co-axial cable, twisted pair, light fiber, etc.) as well as the electrical details of its operation, (e.g., baud rate, number of channels, word transmission size, etc.). At a higher level, the communication links differ in how messages are formatted and in the designation of the meaning of standardized messages.

These components of the industrial controller that are interconnected by the communication links may include a central controller together with remote input or output (I/O) modules accepting data for the central controller from the controlled process or machine and providing data from the central controller as outputs to various actuators on the controlled process or machine. Other components may include graphic displays or specialized secondary controllers such as for motors or the like.

This natural division of the industrial controller along communication links allows many different products to be developed that may be attached to the industrial controller to configure it for different applications. Normally a product will be designed based on a marketing specification that suggests certain functions to be provided by the product. The marketing specification may request that the product work with certain other products on a particular network, however what this entails is not well defined. Further, there is little ability to assess whether a product developed in this context will be inter-operable with other products not considered at the time of its development.

SUMMARY OF THE INVENTION

The present invention recognizes that the question of inter-operability for products in an industrial controller communicating over a communication link can be defined and hence analyzed in terms of the few points of interface between the products on the network, these points of interface termed "services". Products are inter-operable if the services of the first product find complementary services in the second product.

This simple approach allows the inter-operability of products to be analyzed and compared by machine through the steps of defining the products in terms of their services and creating a list of services and their complements.

Specifically the present invention provides a program for assisting in the design of inter-operable industrial control electronic products. The program includes a product database containing a list of products together with their associated services and a service relationship map which links each service to a complementary service. The program also includes instructions executable on an electronic computer that may read the product database and service relationship map. In one embodiment, the program receives from the user, a list of new product services to be provided by a new product and a list of products which should be inter-operable with the new product. The program searches the product database to develop a list of existing product services for the products identified by the user and applies the list of existing product services to the service relationship map to identify a list of complementary product services defining a "virtual inter-operable product", that if constructed, would be inter-operable with the list of products. A description of this virtual inter-operable product is output to the designer and may include technical descriptions of the necessary services.

Thus it is one object of the invention to automatically create a technical description of a product based on defined inter-operability requirements. By isolating issues of inter-operability into services and complementary services, an inter-operable product may be automatically described.

The program may also receive from the user information on how the new product relates to each of the products on the list of products as either a master, a slave or a peer. The program may further provide that when the new product is a master of a particular product, the list of necessary services of the master product includes all complementary services associated with the particular slave product. On the other hand, when the new product is a slave of a particular product, the list of necessary services includes less than all complementary services associated with that particular master product and when the new product is a peer with the particular product, the new product and the peer product each include all complementary services of each other's services.

Thus it is another object of the invention to refine the inter-operability question based on the relationship between products. Necessary services are defined based on the relationships of master, servant or peer-to-peer.

In a second embodiment, the program may receive from the user, a list of new product services to be provided by the new product together with the list of products with which inter-operability should be maintained. In this case, instead of outputting a description of a virtual product providing the desired inter-operability, what is output is a comparison of the services of the virtual product and the services of the new product. This output may include a list of services needed by the new product that are not in the list of new product services or services included in the list of new product services that are not needed. Alternatively the comparison may provide a list of inter-operable products.

Thus it is another object of the invention to simply measure inter-operability of a product when its services are defined.

In a third embodiment, the program may receive from a user a list of products that should work with together, the list designating each particular product and the other, products for which inter-operability should be maintained. In this case, the program outputs a list of those services necessary to ensure inter-operability of the system of the entire list of products.

Thus it is yet another object of the invention to automatically assess the inter-operability of a control system containing an arbitrary set of products.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENT

Figure 1:
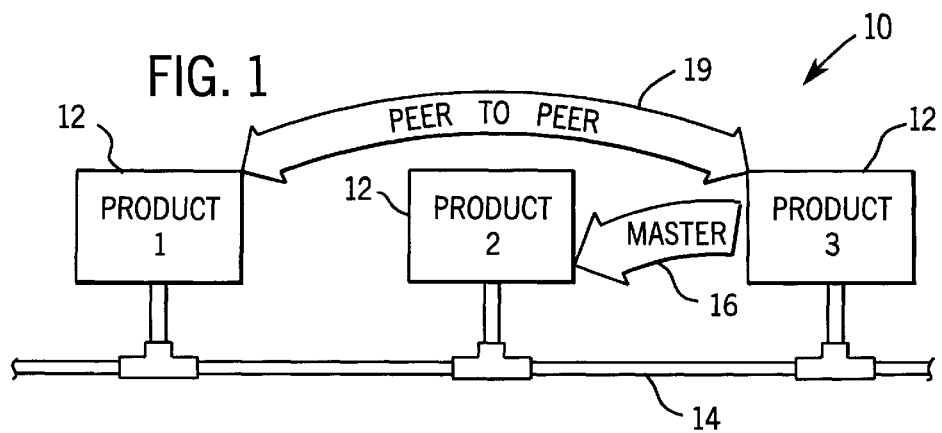
FIG. 1 is a schematic representation of an industrial controller including multiple products connected on a communication link, each product having different relationships to the others.

Referring now to FIG. 1, an industrial control system 10 includes a number of products 12 electrically interconnected by a common communication link 14. As is understood in the art, each product generally includes a network interface to allow the receipt and transmission of data on the communication link 14 and a microprocessor communicating with the network interface and internal memory to process information received from the network and to send commands and receive control signals from a controlled process (not shown). The products 12 may be industrial controllers, I/O modules or display terminals or the like such as are well known in the industrial control system art.

The communication link 14 provides for the transfer of data between the various products 12 according to a network protocol which defines, at its lowest level, the size of the data words transmitted, the speed of data transmission and the format for the data. At a higher level, the communication link 14 may include predefined messages providing standardized responses by the products 12. Typical such messages may include those establishing a connection between products 12 so that subsequent data sent with and referencing a connection identification number may be properly identified and allocated to portions of memory for buffering and the like. Communication links 14 may be, for example, the ControlNet network described in U.S. Pat. No. 5,491,531 issued Feb. 13, 1996 entitled: "A Media Access Controller for a Station on a Communications Network" assigned to the same assignee as the present invention and hereby incorporated by reference, the DeviceNet network described in U.S. Pat. No. 5,452,201 issued Sep. 19, 1995 and entitled: "Industrial Controller with Highly distributed Processing" also assigned to the same assignee as the present invention and hereby incorporated by reference; the Ethernet network or other networks well known in the art.

A given product 12 may have different control relationships with the other products 12. In a master-slave relationship indicated by arrow 16, the slave product, in this case PRODUCT 2, acts responsively only to messages transmitted by the master product, in this case PRODUCT 3. In a peer-to-peer relationship either product, in this case PRODUCT 3 or PRODUCT 1, may initiate a request for data with the other product responding. Generally master products have greater functionality than the slave products, however, master products are often dependent on slave products to perform their expected functions.

Figure 2:
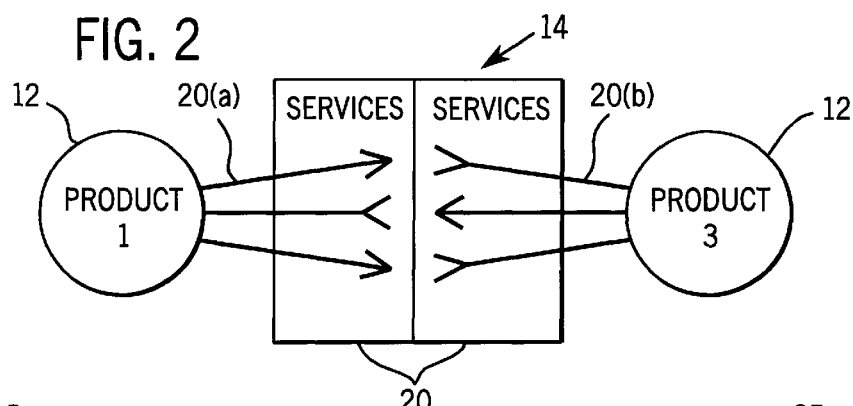
FIG. 2 is a graphic representation of the inter-operability of two of the products of FIG. 1 defined in terms of complementary services at the interface of the communication link of FIG. 1.

Referring now also to FIG. 2, the interconnection of the products 12 by the electrical communication link 14 allows product inter-operability to be defined in terms of specific points of interface between the products 12. Generally, these points of interface will be defined by the communication link 14 and the various messages that may be sent on the communication link 14. These points of interface are comprised of pairs of complementary services 20. For the shown peer products, for example, each service 20a provided by PRODUCT 1 must have a complementary service 20b in PRODUCT 3 if PRODUCT 3 is to be inter-operable with PRODUCT 1. A service 20a, for example, might be the ability to transmit an unconnected point to point message in order to establish a connection with another product on the communication link 14. The complementary service 20b in this case would be the ability to accept an unconnected point to point message in order to establish the connection. Inter-operability between products 12 can be completely defined, therefore, by a listing of the services and a knowledge of which services are complementary to other services.

Figure 3:
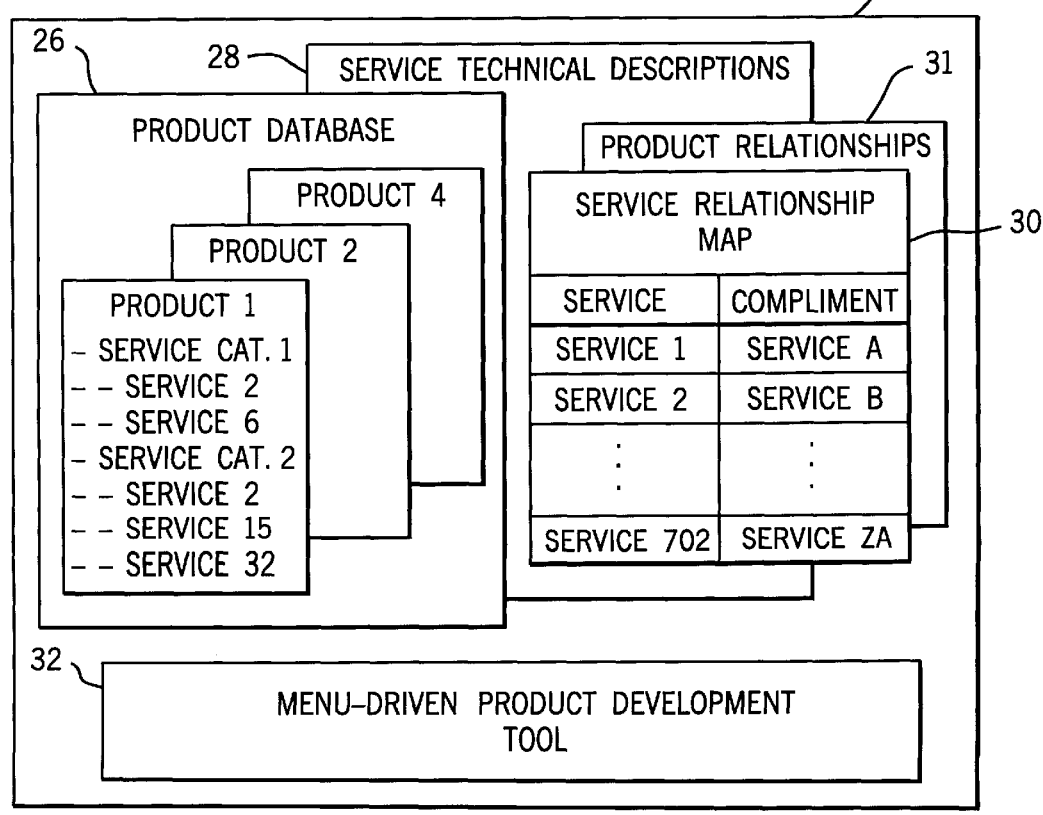
FIG. 3 is a representation of memory of an electronic computer operating the program of the present invention showing the structure of the product database, service relationship map, product relationship table, and showing generally the menu driven product development tool.

Referring now to FIG. 3, the present invention provides a tool for use with an electronic computer of conventional design. The program includes data and executable instructions, both held within the computer memory 25. A first component of the data is a product database 26 which as defined includes a service technical description document 28 which will be described later. Generally the product database 26 is a listing of products 12 defining them by their services 20. A second component of the data is a service relationship map 30 which relates each service 20a to its complement 20b. Thus whereas the product database 26 is essentially a model of each product for inter-operability purposes, the service relationship map 30 is a model of the interface capabilities of the services. A third component of the data is a product relationship table 31 which indicates the relationship of the products of master, slave or peer-to-peer as designated by the user. Finally the memory 25 includes executable code of a program 32 providing a product development tool using the product database 26 and the service relationship map 30.

Associated with each product listed in the product database 26 is a list of services 20 that define that product. For convenience, the services are grouped in service categories which will enable a user to select a group of services by a more convenient reference. For example, a given type of communication link 14 may include a variety of services necessary for full operability on the communications link 14. These services may be grouped under the service category given the name of the communication link 14.

Linked to each service 20 in the product database 26 is a service technical description document 28 which explains the technical requirements of the service. For example, if the service 20 is the sending of an unconnected point to point message to establish a connection, the service technical description document 28 will provide a description of the details of generating such a message and sending on the communication link 14 so that it may be implemented by a designer in the design of a product. The service technical description document 28 in its simplest form is an extensive text document linked having parts linked to each of the services 20. Identical services 20 in different service categories may be linked to the same service technical description document 28 eliminating redundancy in technical descriptions.

The service relationship map 30 simply lists all services 20 each linked to a complementary service 20. A service may be an electronic message sent on the communication link 14 or may be qualities of the communication link 14 such as rise time, band width, polarity or voltage level or even physical attributes of electrical connections to the communications link. Any point of interface between products may serve as a service.

Thus SERVICE 1, as depicted, might be the ability to send an unconnected point to point message to establish a connection. In this case, the complement of SERVICE 1 is SERVICE A which would be the ability to receive an unconnected point to point message in order to establish a connection. Generally all the services 20 listed in the product database 26 are found in the service relationship map 30 both as a service and as a complement to a service. Accordingly if it is necessary to find the complement of any given service 20, that service 20 may be found in the service relationship map 30 and the complement quickly identified.

In certain circumstances, a given service 20 will have as a complement, a number of services 20. For example, a service may consider the rise time of signals on the communication link 14. The service 20 may be defined requiring a rise time of an electrical pulse on the communications link 14 of less than 15 milliseconds. In this case, complementary services would be those having rise times of 2, 5 and 14 milliseconds but not services having rise times of 20 milliseconds.

Figure 4:
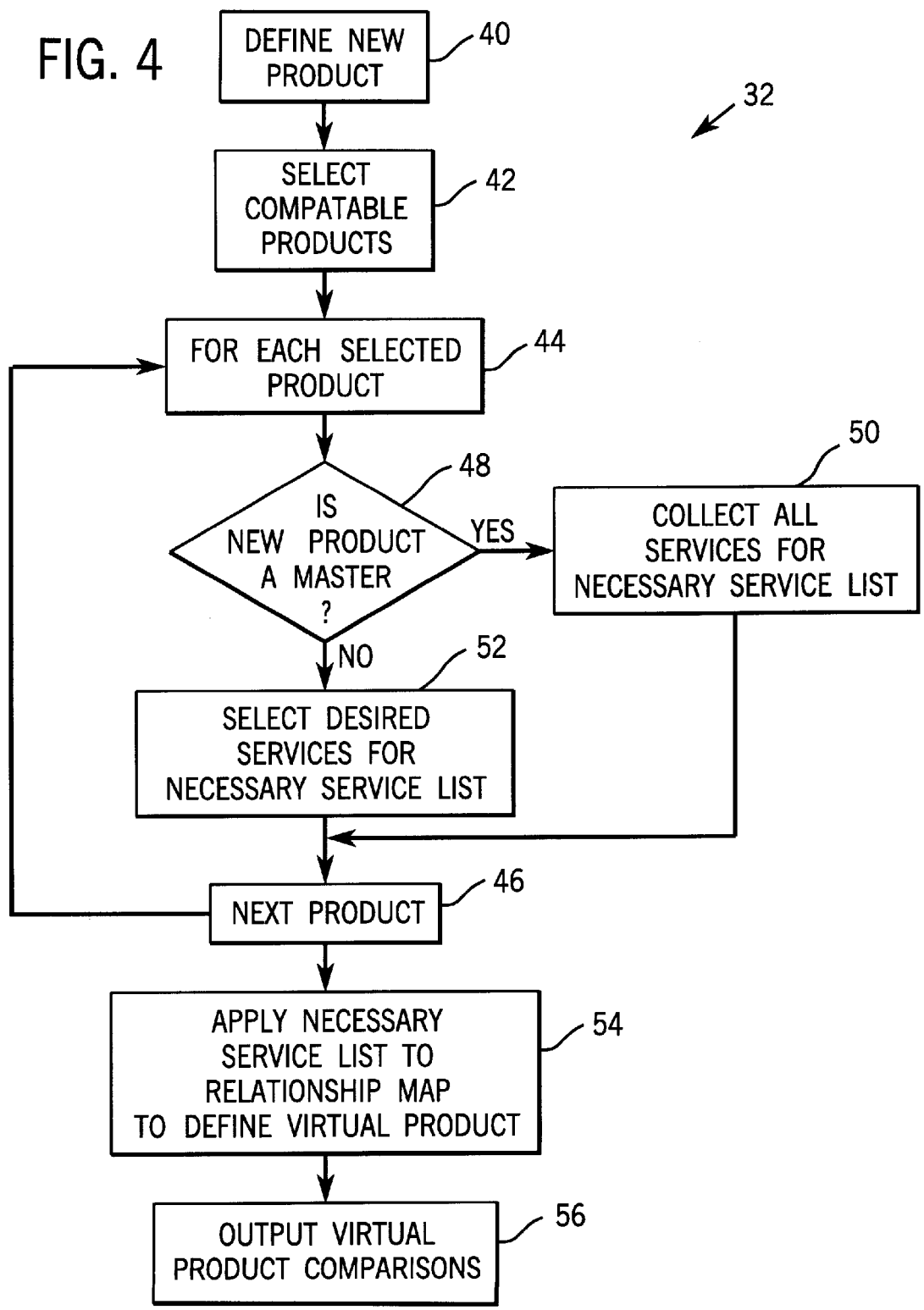
FIG. 4 is a flow chart depicting the steps of the menu driven product development tool of FIG. 3.

Referring now also to FIG. 4, the product development tool program 32 operates to elicit information from a designer of a new product 12 and by using the product database 26 and the service relationship map 30 to identify inter-operability issues based on a definition of the product 12 by its services 20.

As indicated by process block 40, a first step in the program 32, the user indicates a need to define a new product. At this process block 40, the program 32 elicits from the user an arbitrary name of the new product 12 which will be used to identify it in future product databases and a brief description of the product 12. In one mode of operation, the user is also instructed to enter a list of new product services 20 to be provided by the new product 12. In the present example, the new product 12 is designated as PRODUCT 1.

Figures 5, 6, 7:
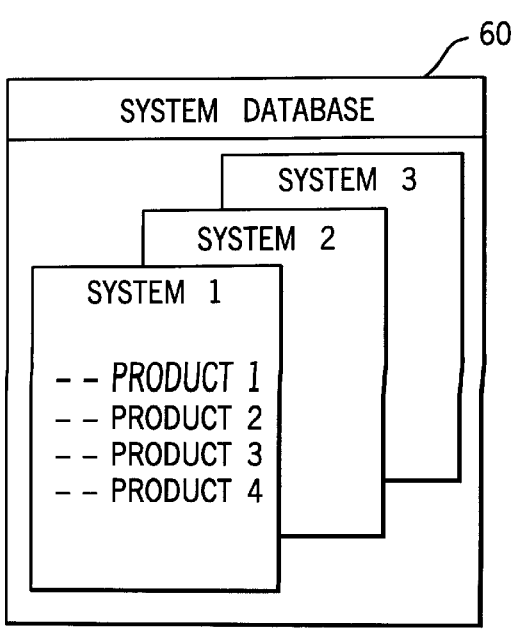
FIG. 5 is a detailed view of the product relationship table of FIG. 3.
FIG. 6 is a view similar to that of FIG. 5 for systems composed of many products.
FIG. 7 is a view of a system database as may be used to compare the inter-operability of a system composed of many products.

Next at process block 42, the user is presented with a list of products 12 from the product database 26 and selects products 12 from that list with which the new product 12 should be inter-operable. At this time a relationship between the new product 12 and the selected products 12 may be described as either master, slave, or peer-to-peer and this relationship is entered into a product relationship table 31 as shown in FIG. 5.

In this example, PRODUCT 1 PRODUCT 2 are selected and have the following service categories and services as found in the product database 26 and as indicated in Table I.

TABLE I

| Product 1 | Product 2 |
|---|---|
| Service Category 1 | Service Category 1 |
| Service 2 | Service 6 |
| Service 6 | |
| Service Category 2 | |
| Service 2 | |
| Service 15 | |
| Service 32 | |

PRODUCT 2 is designated as a slave to PRODUCT 1 and PRODUCT 3 is designated as a peer of PRODUCT 1 in the product relationship table 31.

The program 32 then proceeds to examine each of the selected products 12 in a loop formed by process blocks 44 and 46. For each selected product 12, the loop, at decision block 48 checks the product relationship table 31 to see if the new product (i.e., PRODUCT 3) will be a master or peer of that selected product 12. If so then at process block 50, all of the services 20 associated with the selected product 12 in the product database 26 are collected into a "necessary service list". If at decision block 48 however, the new product 12 is not a master or peer of the selected product 12 but a slave, then at process block 52 the user may select among the services 20 listed for the product 12 in the product database 26 and only the user-selected services will be included in the necessary service list. In this example, PRODUCT 3 is a master of PRODUCT 2 so all the services 20 of PRODUCT 2 are placed in the necessary service list. PRODUCT 3 is also a peer of PRODUCT 1 so all the services 20 of PRODUCT 1 are placed in the necessary service list. This process is repeated for each of the selected products 12 until all selected products 12 have been reviewed and services 20 of the products 12 included into the compilation of the necessary service list.

In collecting the necessary service list, duplicate services 20 are eliminated. Thus the necessary service list provides a limited core of services necessary to provide inter-operability with each of the products 12 selected in process block 42.

For the products of Table I the necessary service list will be as follows:

TABLE II

| Product 3 |
|---|
| Service Category 1 |
| Service 2 |
| Service 6 |
| Service Category 2 |
| Service 15 |
| Service 32 |

PRODUCT 1 and PRODUCT 3 are peers so PRODUCT 3 should provide all of the services of PRODUCT 1. The necessary service list includes Service 2 only once as it was redundant under Service Categories 1 and 2 of PRODUCT 1. PRODUCT 3 and PRODUCT 2 are in a relationship of master and slave. Therefore PRODUCT 3 should provide all the services of PRODUCT 1; in this case Service 6 which is already obtained in PRODUCT 1.

When all products 12 have been reviewed at process block 54, the necessary service list is applied to the service relationship map 30, to find all the complement services for the services of the necessary service list. These complement services together define a virtual product that would be inter-operable with each of the selected products 12. After application of the service relationship map 30 the necessary service list for PRODUCT 3 becomes as follows:

TABLE III

| Product 3 |
| --- |
| Service Category 1 |
| Service B |
| Service F |
| Service Category 2 |
| Service O |
| Service AE |

The services of Table III define a virtual product which if manufactured would be inter-operable in the necessary relationships with PRODUCT 1 and PRODUCT 2.

At process block 56, these complementary services 20 are output to the user and serve to describe the virtual product. The virtual product is one that the new product 12 should emulate if it is to have the indicated inter-operability. This output may most simply be a list of the necessary services together with the service technical descriptions that will enable the designers to manufacture an inter-operable product.

If in the defining of the new product 12 at process block 40, the user has listed the services 20 expected to be provided by the new product 12, then at process block 56, the services expected to be provided by the new product 12 may be compared to the services 20 associated with the virtual product (Table III) and the output may include a listing of those services provided by the virtual product that are not in the services 20 of the new product as provided at process block 40. This listing indicates the extent to which the new product 12 will not have the desired inter-operability with the products selected at process block 42.

Alternatively the same comparison process may provide the user with a list at process block 56 of services 20 in the new product 12 that are not needed to provide inter-operability with the products selected at process block 42.

By similar token, the missing or redundant services 20 identified at process block 56 may be compared to the services listed within the product database 26 to provide an output to the user indicating those products 12 with which inter-operability has been maintained and those products 12 with which inter-operability cannot be guaranteed as a result of an incomplete matching of the services 20 of the new product 12 and the services required by the potentially inter-operable products 12.

If PRODUCT 3 as a new product had services 2 and 6 defined for it at process block 40, then at process block 56, Services 15 and 32 would be indicated as missing for the necessary inter-operability. If inter-operability of products is to be output, then inter-operability would be indicated only for PRODUCT 2 and not for PRODUCT 1. Conceivably PRODUCT 3 might have had a Service 44 entered at process block 40. In this case at process block 56, service 44 would be indicated as redundant and unnecessary.

The present invention may also find use in establishing whether a control system made up of a number of products will function. In this case, each of the constituent products in turn is cast as the new product 12 at process block 40 and the remaining products are entered at process block 42. Services missing or products that will be inter-operable are listed and then the next constituent product is made, the new product and so forth. This process of cycling through the constituent products as the new product may be automatically provided by the program 32. The result is a global view of the inter-operability of a control system prior to its construction.

The invention may also be used to check the inter-operability of systems composed each of sets of products. Referring also to FIG. 7 in this case, a system data base 60 is established listing the products (with links to the product data base 26) in each of the systems. In this case after identifying the systems, the user is presented with a list of products 12 in the systems from the system database 60 and selects products 12 from that list with which the new product 12 should be inter-operable. At this time a relationship between the new product 12 and the selected products 12 may be described as either master, slave, or peer-to-peer and this relationship is entered into a product relationship table 31 as shown in FIG. 6. In this case a new category of "X", meaning "don't care", is added to the three relationships of master, slave, and peer-to-peer, this X category meaning that no compatibility is required between two products of different systems. As described above, each of the constituent products in turn is cast as the new product 12 at process block 40 and the remaining products (except for those marked don't care) are entered at process block 42.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

I claim:

1. A program implemented method for assisting in the design of inter-operable industrial control electronic products communicating on a common communication link, the products electrically communicating with other products via services defining points of interface between products necessary for the products to operate together using the common communications link, where each product treats another interconnecting product as a master, slave or peer, the program comprising:

a product database containing a list of industrial control products together with their associated services;

a service relationship map linking the associated electrical services to complementary electrical services where a service and its complement are necessary for two products to operate together using the common communications link;

instructions executable on an electronic computer holding the product database and the service relationship map in memory, the instructions to:

(a) receive from the user a list of industrial control products with which inter-operability should be maintained;

(b) search the product database of the list of industrial control products to develop a list of necessary services for the products of step (a);

(c) apply the list of necessary product services to the service relationship map to identify a list of complementary product services defining at least one inter-operable product that may operate with the products of the list using the common communications link; and (d) output a description of the inter-operable product.

2. The program implemented method of claim 1 wherein the output of the description of the virtual inter-operable product is a list of services and technical descriptions of the services.

3. The program implemented method of claim 1 wherein the services are electronic messages between products.

4. The program implemented method of claim 1 wherein the products communicate on a communication link and wherein services are electronic messages between products on a particular communications link.

5. The program implemented method of claim 1 wherein the instructions executable on an electronic computer also include instructions:

(e) receiving from the user information on how the new product relates to each product of the list of products as a master, a slave or a peer and wherein the instructions provide that:

(i) when the new product is a master of a particular product on the list of products, including in the list of necessary product services all services associated with that particular product;

(ii) when the new product is a slave or peer of a particular product on the list of products, including in the list of necessary product services less than all services associated with that particular product.

6. The program implemented method of claim 1 wherein at step (c) the user selects a subset of the associated services for the list of necessary product services.

7. A program implemented method for assisting in the design of inter-operable industrial control electronic products, the products communicating on a common communication link, the products electrically communicating with other products via services defining points of electrical interface between products necessary for the products to operate together using the common communications link, where each product treats another interconnecting product as a master, slave or peer, the program comprising:

a product database containing a list of industrial control products together with their associated services;

a service relationship map linking the associated electrical services to complementary electrical services where a service and its complement are necessary for two products to operate together using the common communications link;

instructions executable on an electronic computer holding the product database and the service relationship map in memory, the instructions to:

(a) receive from a user a list of new product services to be provided by a new industrial control product;

(b) receive from the user a list of industrial control products with which inter-operability should be maintained;

(c) search the product database of the list of products to develop a list of necessary product services for the products of step (b);

(d) apply the list of necessary product services to the service relationship map to identify a list of complementary product services defining a virtual inter-operable product that may operate with the services of the list of necessary product services using the common communications link;

(e) output a comparison between the services of the virtual product and the services of the new product.

8. The program implemented method of claim 7 wherein step (e) outputs to the user a list of services needed by the new product not in the list of new product services.

9. The program implemented method of claim 7 wherein step (e) outputs to the user a list of services in the list of new product services that are not needed.

10. The program implemented method of claim 7 wherein step (e) outputs to the user a list of inter-operable products.

11. The program implemented method of claim 7 wherein the service relationship map links a given service with a range of complementary services.

12. The program implemented method of claim 7 wherein the instructions also include instructions (f) receiving from the user information on how the new product relates to each product of the list of products as a master, a slave or a peer and wherein the instructions provide that:

(i) when the new product is a master of a particular product on the list of products, including in the list of necessary product services all services associated with that particular product, (ii) when the new product is a slave or peer of a particular product on the list of products, including in the list of necessary product services less than all services associated with that particular product.

13. A program implemented method for assisting in the design of inter-operable industrial control electronic products communicating on a common communication link, the products electrically communicating with other products via services defining points of interface between products necessary for the products to operate together using the common communications link, where each product treats another interconnecting product as a master, slave or peer, the program comprising:

a product database containing a list of industrial control products together with their associated services;

a service relationship map linking the associated electrical services to complementary electrical services where a service and its complement are necessary for two products to operate together using the common communications link;

instructions executable on an electronic computer holding the product database and the service relationship map in memory, the instructions to:

(a) receive from a user a list of industrial control products that should work together, the list designating each particular industrial control product and the other industrial control products for which inter-operability should be maintained;

(b) search the product database of the list of industrial control products to develop a list of necessary product services for the particular products of step (b);

(c) apply the list of necessary product services to the service relationship map to identify a list of complementary product services;

(d) for each particular product and for each other product which inter-operability should be maintained, search the product list for services on the list of complementary product services needed so that an industrial control product may operate with the other products with which inter-operability should be maintained using the common communications link; and (e) output an indication of the complementary product services not available from the other products.

14. The program implemented method of claim 13 wherein the instructions also include instructions (f) receiving from the user information on how each particular product relates to the other product of the list of products as a master, a slave or a peer and wherein the instructions provide that:

(i) when the particular product is a master of another product on the list of products, including in the list of necessary product services for the particular product, all services associated with the particular product, (ii) when the particular product is a slave or peer of another product on the list of products, including in the list of necessary product services less than all services associated with the particular product.

* * * * *